US005361085A

United States Patent [19]

Vance

[11] Patent Number: 5,361,085

[45] Date of Patent: Nov. 1, 1994

[54] METHOD AND APPARATUS FOR PRINTING MEDICAL INFORMATION SIGNALS

[75] Inventor: Gary C. Vance, Fox Island, Wash.

[73] Assignee: SpaceLabs Medical, Inc., Redmond, Wash.

[21] Appl. No.: 846,088

[22] Filed: Mar. 5, 1992

[51] Int. Cl.[5] .......... G01D 15/10

[52] U.S. Cl. .......... 347/101; 346/33 ME; 355/311; 358/296

[58] Field of Search .......... 346/1.1, 108, 136; 358/296, 404; 355/311, 204

[56] References Cited

U.S. PATENT DOCUMENTS

| | | | |
|---|---|---|---|
| 4,672,465 | 6/1987 | Ono | 358/296 |
| 4,780,740 | 10/1988 | Fukae | 355/311 |
| 4,827,358 | 5/1989 | Matsumoto | 358/296 |
| 4,839,737 | 6/1989 | Saito | 358/257 |
| 4,897,735 | 1/1990 | Oneda | 358/449 |
| 4,945,477 | 7/1990 | Edwards | 364/413.06 |
| 4,965,590 | 10/1990 | Yamazaki | 346/108 |
| 4,978,973 | 12/1990 | Ogushi et al. | 346/76 PH |
| 4,998,216 | 3/1991 | Hino et al. | 364/519 |
| 5,174,668 | 12/1992 | Sakamoto et al. | 400/582 |
| 5,189,609 | 2/1993 | Tivig et al. | 364/413.01 |
| 5,220,431 | 6/1993 | Yamagguchi | 358/296 |

FOREIGN PATENT DOCUMENTS

WO8910842 11/1989 WIPO .

OTHER PUBLICATIONS

Eaton, R. B., "Automatic Paper Size Sensing and Lead Edge Detection Using Full Width (1 to 1) Image Sensors," *Xerox Disclosure Journal.* 13(4):225, 1988.

Yamada, D., "Electronic Typewriter," *Patent Abstracts of Japan.* 11(336), Nov. 4, 1987.

Ichikawa, Y., "Printer," *Patent Abstracts of Japan.* 10(77), Mar. 26, 1986.

*Primary Examiner*—R. L. Moses

*Assistant Examiner*—T. A. Dang

*Attorney, Agent, or Firm*—Seed and Berry

[57] ABSTRACT

A medical monitor is constructed to be coupled to a printer module for providing medical information signals to the printer module to be printed. The printer module is constructed to be used with two paper trays for accommodating two sizes of paper and includes a switch for sensing which paper tray is inserted in the printer module. The printer module is responsive to the switch to request that the medical information signals be provided in either the first or the second format. The printer module includes a thermal array printing head and is responsive to the medical information signals provided in the first format to print using substantially all of the length of the thermal array printing head and is responsive to the medical information signals provided in the second format to print using a predetermined portion of the thermal array printing head.

18 Claims, 3 Drawing Sheets

METHOD AND APPARATUS FOR PRINTING MEDICAL INFORMATION SIGNALS

TECHNICAL FIELD

The present invention is directed toward a medical monitor for printing medical information signals and, more particularly, toward a printer for use with a medical monitor and printing trays for automatically printing medical information signals in two formats.

BACKGROUND OF THE INVENTION

Medical monitors for gathering and displaying medical information concerning the physiological status of a patient are well known. Examples of the physiological status monitored by such devices include a patient's heart rate, electrocardiogram (EKG), breathing rate, etc. Many medical monitors include a display for providing immediate information to a user. However, information displayed to the user is not retained after it is displayed for use by other medical personnel. Some medical monitors are capable of being used in combination with a printer to print the medical information so that it can be kept and referred to by other medical personnel.

Conventional medical monitors that are capable of being used in combination with printers use strip chart recorders that have thermal array printing heads. Strip chart recorders are preferred since they are most convenient for recording the elongate graph-like information typically provided by medical monitors. Thermal array printing heads are preferred since they are quiet providing comfort to the patient being monitored as well as neighboring patients. Further, thermal array printing heads provide substantially laser quality printing without the delay that is typical of laser printers.

Strip chart recorders that are in common use with medical monitors are constructed to print the medical information in various formats that differ by the width of the paper that the strip chart recorder is constructed to accommodate. Common sizes for strip chart recorder paper is approximately two inches in width and approximately four inches in width. Although strip chart recorders can be manufactured to accommodate either of the foregoing paper sizes, or any other of a wide range of paper sizes, strip chart recorders typically available are not capable of printing on paper of various sizes. In other words, once manufactured, a particular strip chart recorder is capable of being used with only one size paper.

These strip chart recorders, and medical monitors that are constructed for use in combination with these strip chart recorders, are not desirable since they limit the ability of the user to select the appropriate paper size for the specific monitoring task. As an example, strip chart recorders that are constructed for use with paper of a relatively small width preserve the paper that is used and, since the paper used with thermal array printing heads is expensive, save cost. However, these strip chart recorders are disadvantageous for tasks that require more information be printed than what can be positioned on the relatively small width paper. As another example, strip chart recorders that are constructed for use with paper of a relatively large width allow for more information to be printed but provide a substantial waste of paper for tasks that require less information to be printed. Accordingly, it is desirable to provide a medical monitor that is capable of printing information on paper of various sizes.

Some medical monitors have been manufactured that can be used with various strip chart recorders so that different strip chart recorders can be selected to vary the size of paper to be printed upon. These medical monitors are not desirable since they typically require that the medical monitor be reconfigured when the strip chart recorder is changed so that the medical information is properly formatted for the paper width that is being used. The user will often print little information when a patient's condition is relatively stable, but should the patient's condition change, then it is necessary to rapidly begin to print more medical information. However, using the above-described strip chart recorders valuable time is wasted while reconfiguring the medical monitor, time that medical information could be recorded and that the user could be attending to other, more important tasks. Accordingly, it is desirable to provide a medical monitor that is capable of printing on paper of various widths and of rapidly changing from one paper width to another.

SUMMARY OF THE INVENTION

The present invention is directed toward a strip chart recorder for printing medical information signals from a medical monitor wherein the medical information signals are indicative of the medical status of a patient. The monitor is constructed to provide the medical information signals in first and second formats wherein the first format corresponds to that necessary for printing information on paper having a relatively large width and wherein the second format corresponds to that necessary for printing the information on paper having a relatively small width.

The strip chart recorder includes a printer for printing information from the medical information signals. The printer includes a thermal array printing head and is responsive to the medical information signals for controlling the thermal array printing head to print information indicating the status of the patient wherein substantially all of the thermal array printing head is used when the medical information signals are provided in the first format and wherein a predetermined portion of the thermal array printing head is used when the medical information signals are provided in the second formats. The printer further includes a paper tray receptacle having a switch mounted therein. The printer is responsive to the switch for requesting the medical information signals be provided in the first and second format. The printer further includes a drive gear for providing rotating energy.

The strip chart recorder also includes a first paper tray for dispensing paper of a first width upon which the information indicating the status of the patient will be printed. The first paper tray is constructed to be inserted in the receptacle of the printer and is constructed so that when inserted the switch of the printer is engaged and the medical information signals are requested in the first format. The first paper tray further includes a first roller of a length substantially equal to that of the thermal array printing head and is responsive to the drive gear of the printer for rotating the first roller to move paper of the first width past the thermal array printing head.

The strip chart recorder also includes a second paper tray for dispensing paper of a second width upon which the information indicating the status of the patient will be printed. The second paper tray is constructed to be inserted in the receptacle of the printer and to not engage the switch of the printer so that the medical information signals are requested in the second format. The second paper tray includes a second roller having a length substantially equal to the predetermined portion of the thermal array printing head and is responsive to the drive gear of the printer for rotating the second roller to move paper of the second width past the predetermined portion of the thermal array printing head.

DETAILED DESCRIPTION OF THE INVENTION

Figure 1:
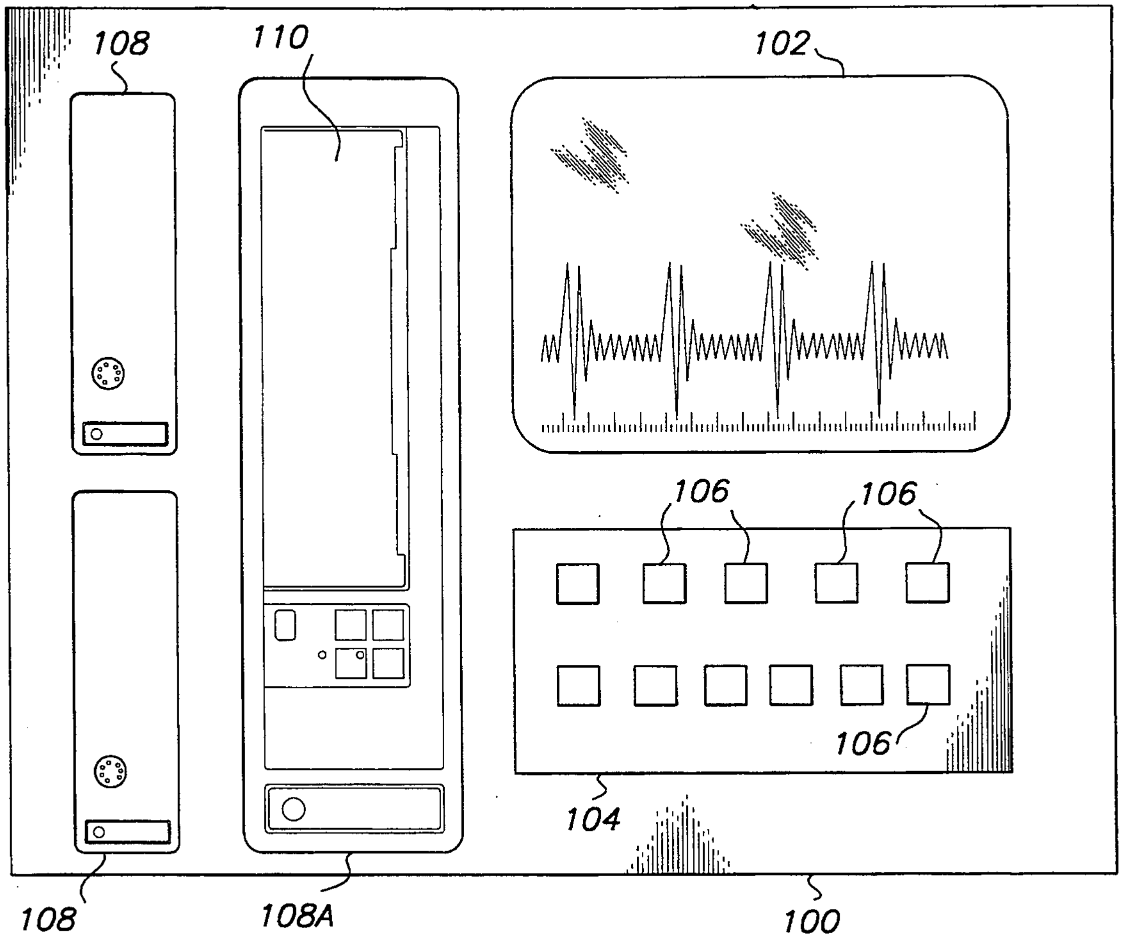
FIG. 1 is an illustrative drawing of the medical monitor that is the subject of the present invention.

A medical monitor 100 that is the subject of the present invention is illustrated in FIG. 1. The medical monitor 100 is constructed for monitoring various physiological states of a patient, as is known in the art. As examples, the medical monitor 100 may be constructed to monitor the heart rate of a patient, the breathing rate of a patient, etc. Those skilled in the art can readily provide medical monitors, for monitoring various physiological states of a patient, that can be constructed for use with the subject invention.

The medical monitor 100 includes a display 102 for displaying medical information related to the physiological condition being monitored. The medical monitor 100 also includes a keyboard 104, having a plurality of switches 106, for receiving information from a user. The display 102 and keyboard 106 cooperate to interface the user with the medical monitor 100 so that the user can select the physiological condition to be monitored and so that the user can configure the medical monitor 100 for the specific task required.

The medical monitor 100 further includes a plurality of peripheral ports 108, each of which is constructed for receiving peripheral devices for use with the medical monitor. As an example, the peripheral ports 108 may be constructed to receive a disk drive for recording medical information on convention computer disks so that the medical information may be saved and later accessed. The peripheral ports 108 may also be constructed to receive special monitoring modules for monitoring a physiological condition that the medical monitor 100 is not capable of monitoring and for providing medical information to the medical monitor 100 to be displayed to the user or stored on a conventional computer disk, as discussed above.

Particularly, the peripheral port 108A has mounted therein a printer module 110 for printing the medical information for the user. The printer module 110 comprises a conventional strip chart recorder for printing information on thermally responsive paper as will be discussed in more detail below. Each of the peripheral ports 108 includes a connector constructed to mate with a connector of the printer module 110 for transferring information between the printer module 110 and the medical monitor 100. Particularly, the medical monitor 100 provides medical information signals to the printer module 110 that are used for printing the medical information of the patient.

In the presently preferred embodiment of the invention, the medical information signals are provided in first and second formats. When provided in the first format, the medical information signals are intended to be used by the printer module 110 to print medical information upon paper having a relatively large width. When provide in the second format, the medical information signals are intended to be used by the printer module 110 to print medical information upon paper having a relatively small width. It will be readily apparent to those skilled in the art how the medical monitor 100 can be constructed to provide the medical information signals in the first and second formats described herein.

Figure 2:
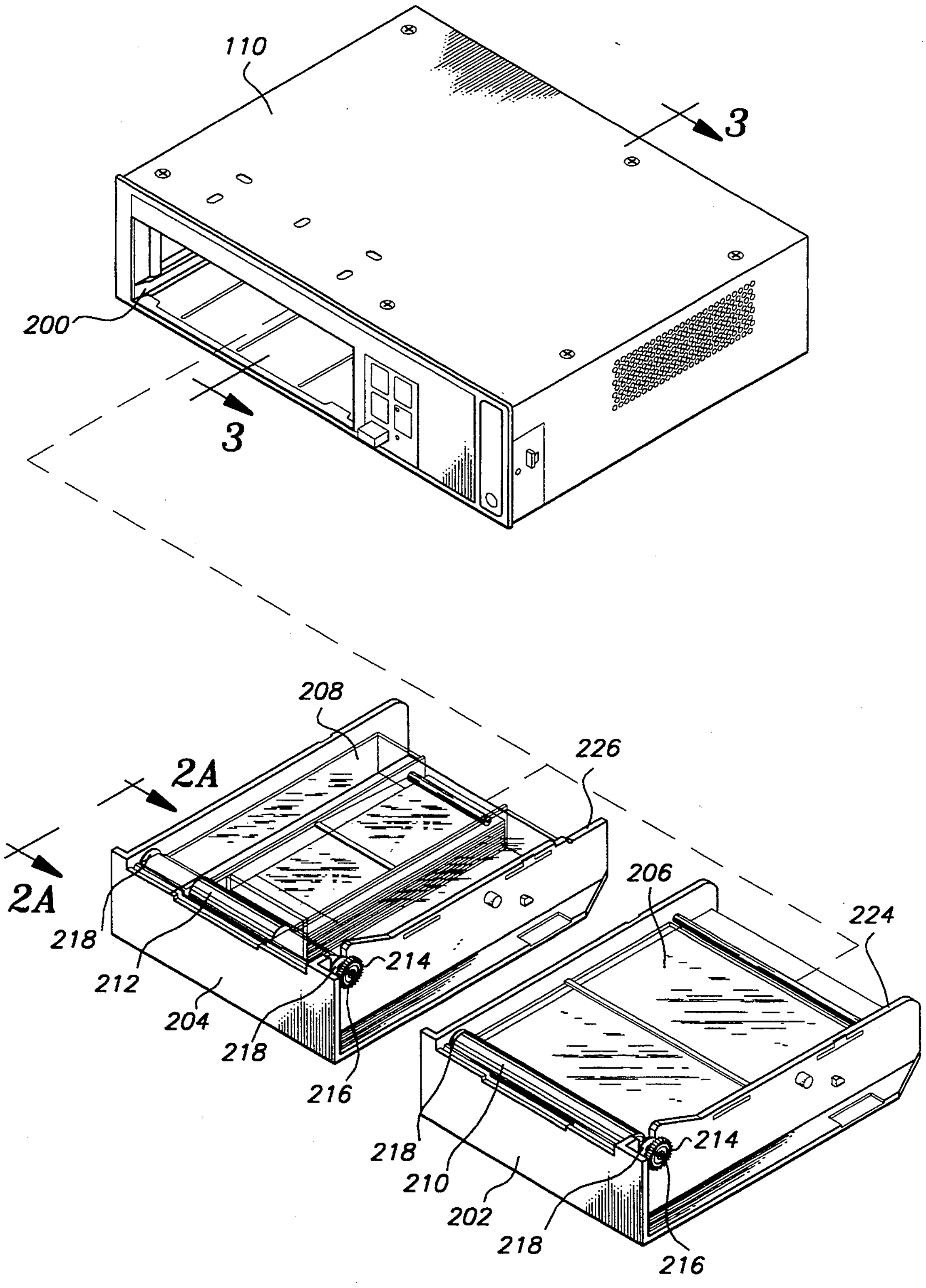
FIG. 2 is a perspective view of a strip chart recorder and two paper trays constructed in accordance with the subject invention.

With reference to FIG. 2, a more detailed description of the printer module 110 will be provided. The printer module 110 is constructed of a size and shape to mate with two of the peripheral ports 108 of the medical monitor 100. Although the printer module 110 is described herein as being constructed to mate with two of the peripheral ports 108 of the medical monitor 100, it will be apparent to those skilled in the art that the printer module 110 could be coupled to the medical monitor 100 in a variety of ways. It is important to the invention, however, that the printer module 110 is electrically coupled to the medical monitor 100 for transferring electrical signals therebetween. In the presently preferred embodiment of the invention, the printer module 110 is constructed to be received in two adjacent peripheral ports of the medical monitor 100.

Figure 3:
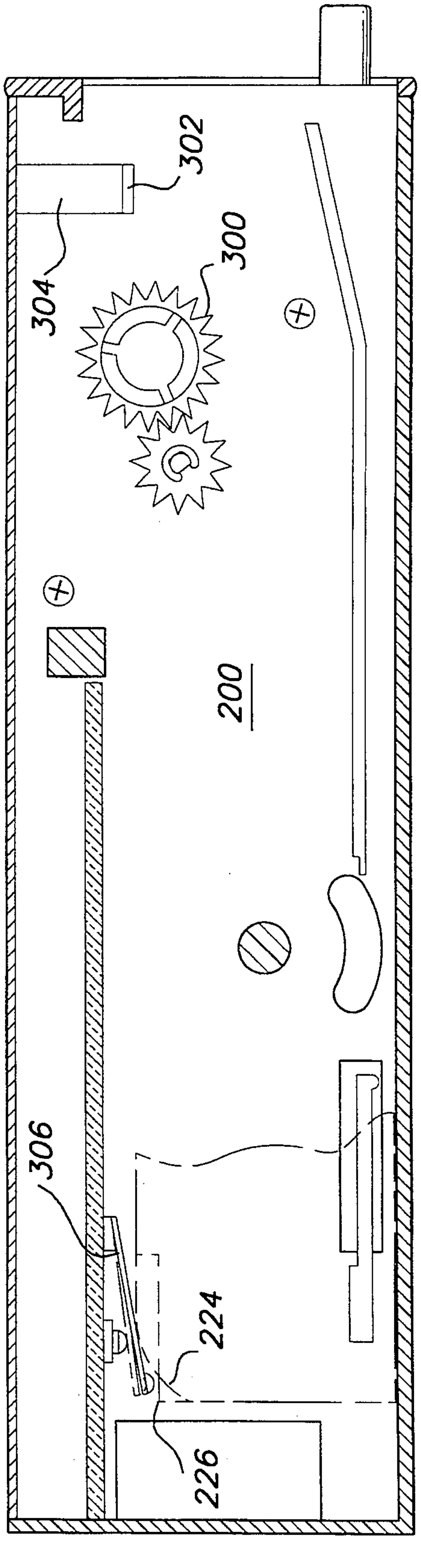
FIG. 3 is a sectional view taken along line 3—3 of the strip chart recorder of FIG. 2.

The printer module 110 includes a paper tray receptacle 200 for receiving first and second paper trays 202 and 204, respectively. As best illustrated in FIG. 3, the paper tray receptacle 200 includes a drive gear 300. The drive gear 300 is mechanically coupled to a stepper motor (not shown) for receiving rotating energy from the stepper motor (not shown) and for transferring the rotating energy to the first and second paper trays 202 and 204, as will be discussed in more detail below.

The paper tray receptacle 200 also includes a thermal array printing head 302 that is springably mounted to the paper tray receptacle 200 by a spring tension system 304. As is known in the art, conventional thermal array printing heads must be maintained in contact with the thermally responsive paper upon which they print so that heat generated by the thermal array printing head is transferred to the paper to result in printing. However, during normal operation the paper is moved past the thermal array printing head to permit continuous printing. As a result, tight tolerances are typically provided for the pressure between the thermal array printing head and the paper to maximize the quality of the print and the life of the thermal array printing head while minimizing the possibility of malfunction of the printer. The spring tension system 304 is used in combination with the first and second paper trays 202 and 204 to maintain the pressure between the thermal array printing head 302 and the paper to within the required tolerances.

The printer module 110 is responsive to the medical information signals to control the thermal array printing head 302 to print information, as will be discussed in more detail below. In particular, when the medical information signals are provided in the first format, the printer module 110 controls the thermal array printing head 302 to print using substantially the entire length of the thermal array printing head. Conversely, when the medical information signals are provided in the second format, the printer module 110 controls the thermal array printing head 302 to print using a predetermined portion of the thermal array printing head. It will be readily apparent to those skilled in the art how the printer module 110 may be constructed to control the thermal array printing head 302 in accordance with the present invention.

The paper tray receptacle 200 further includes a switch 306 mounted therein for providing a paper tray signal. The switch 306 is constructed to indicate which paper tray is positioned in the paper tray receptacle 200, as will be described in more detail below. The printer module 110 is responsive to the switch 306 for providing a reformat signal to the medical monitor 100 to instruct the medical monitor 100 to provide the medical information signals in either the first or second format. In particular, when the switch 306 is closed and the paper tray signal is provided, the printer module 110 will provide the signal to request that the medical information signals be provided in the first format. Conversely, when the switch 306 is not closed so that the paper tray signal is not provided, the printer module 110 will provide the reformat signal to request that the medical information signals be provided in the second format.

Returning to FIG. 2, each of the paper trays 202 and 204 is constructed to be inserted into the paper tray receptacle 200. Also, each of the paper trays 202 and 204 includes a respective guide insert 206 and 208 constructed to guide thermally responsive paper of a predetermined width past the thermal array printing head 302 of the printer module 110 when the paper tray 202 or 204 is inserted in the paper tray receptacle 200. In the presently preferred embodiment of the invention, the paper tray 202 is constructed to provide paper approximately four and one half inches in width while the paper tray 204 is constructed to provide paper approximately two inches in width. However those skilled in the art will recognize that the subject invention may be used in combination with paper having a wide range of widths, limited only be the length of the thermal array printing head 302.

The paper tray 202 includes a roller 210 for engaging the paper contained therein and for propelling the paper past the thermal array printing head 302. The roller of the paper tray 202 is constructed of a length substantially equal to that of the paper that it is designed to provide. Further, the roller 210 is of a length substantially equal to the length of the thermal array printing head. Similarly, the paper tray 204 includes a roller 212 for engaging the paper contained by the paper tray 204 and for propelling the paper past the thermal array printing head 302. The roller 212 is constructed of a length substantially equal to the width of the paper that it is designed to provide and is equal to the predetermined portion of the length of the thermal array printing head 302. It will be apparent to those skilled in the art that providing the roller 212 of a size smaller than that of the roller 210 is designed to control the energy to propel the paper and to prolong the life of the thermal array printing head.

Each of the paper trays 202 and 204 also includes a drive gear 214 constructed to mate with the drive gear 300 of the paper tray receptacle when the respective paper tray is inserted therein. The drive gear 214 is provided for receiving the rotational energy from the stepper motor (not shown) and for rotating the rollers 210 and 212 of the first and second paper trays 202 and 204, respectively.

Figure 2A:
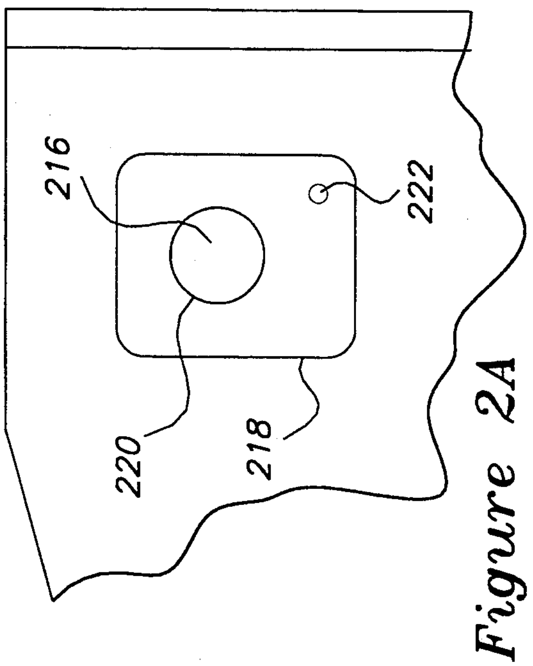
FIG. 2A is a detailed illustration of the eccentric bearings of the paper trays illustrated in FIG. 2.

The rollers 210 and 212 and the drive gears 214 are mounted upon a shaft 216 that is in turn mounted to a eccentric bearing 218. The eccentric bearing 218 is provided for positioning the rollers 210 and 212 in the paper trays 202 and 204 to provide a predetermined pressure between the thermal array printing head 302 and the paper provided by the paper tray. The eccentric bearing includes a through hole 220 through which the shaft 216 is threaded. The through hole 220 is offset from the center of the eccentric bearing 218, as best illustrated in FIG. 2A. The eccentric bearing 218 also includes a index mark 222 used to indicate the direction that the through hole 220 is offset from the center.

The through hole 220 is positioned in the eccentric bearing 218 so that it can be used with both paper trays 202 and 204 to position the rollers 210 and 212 so that the predetermined amount of pressure is provided between the paper and the thermal array printing head 302. As discussed above, tight tolerances are provided for the pressure that must be provided between the thermal array printing head and the thermally responsive paper. However, since the roller 212 is smaller in length than the roller 210 and, therefore, will contact less area of the thermal array printing head, to maintain the predetermined pressure between the thermal array printing head 302 and the roller 212, a slightly smaller unit force must be provided by the roller 2 12 than is provided by the roller 210.

To obtain this goal, the eccentric bearing 218 is constructed so that when used with the paper tray 202, it is positioned with the index mark 222 remote from the thermal array printing head 302 so that the shaft 216 and the roller 210 are closer to the thermal array printing head 302 providing a slightly greater unit force to provide the predetermined pressure. Alternatively, when the eccentric bearing 218 is used with the paper tray 204, it is positioned with the index mark 222 proximate the thermal array printing head 302 so that the shaft 216 and the roller 212 are farther away from the thermal array printing head 302 providing a slightly less unit force to provide the predetermined pressure. It will be apparent to those skilled in the art that a wide variety of ways for positioning the rollers 210 and 212 to provide the predetermined pressure are possible without departing from the scope and spirit of the subject invention.

The paper tray 202 is constructed with a remote edge 224 that is full so that when the paper tray 202 is inserted in the paper tray receptacle 200, the edge 224 engages and closes the switch 306, as illustrated in FIG. 3 wherein the remote edge 224 of the paper tray 202 is shown in phantom. As discussed above, when the switch 306 is closed, the printer module 110 requests the medical information signals to be provided in the first format and controls the thermal array printing head 302 so that the medical information signals are printed using substantially all of the thermal array printing head 302.

Returning to FIG. 2, the paper tray 204 includes a remote edge 226 that is trimmed so that when the paper tray 204 is inserted in the paper tray receptacle 200, the remote edge 226 does not engage the switch 306 and the switch 306 remains open, as illustrated in FIG. 3 wherein the remote edge 226 is also shown in phantom. As discussed above, when the switch 306 is open, the printer module 110 requests the medical information signals to be provided in the second format and controls the thermal array printing head 302 so that the medical information signals are printed using the predetermined portion of the thermal array printing head 302.

Accordingly, the switch 306 is used in combination with the remote edges 224 and 226 to sense which paper tray 202 or 204, respectively, is inserted in the paper tray receptacle 200. Other sensing apparatus and schemes may be substituted therefor without departing from the spirit of the present invention.

In operation, the printer module 110 monitors the paper tray signal provided by the switch 306 and, whenever the status of the paper tray signal changes, indicating a change in the paper tray, the printer module 110 provides the signal to the medical monitor 100 to request that the medical information signals be provided in the format appropriate for the new paper tray. The medical monitor 100 responds to the signal to provide the medical information signals in the first or second format as requested. The printer module 110 is responsive to the medical information signals provided in the first format to control the thermal array printing head to print using substantially all of its length and is responsive to the medical information signals provided in the second format to control the thermal array printing head to print using the predetermined portion of its length.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

I claim:

1. Apparatus for recording medical information, wherein the medical information is indicative of a medical status of a patient comprising:

monitoring means for sensing a medical stimulus to obtain stimulus signals, said monitoring means further including a user interface for receiving information from a user and for displaying information to the user wherein said received information includes a display signal, said monitoring means including a monitor data processor for processing said stimulus signals to provide medical information signals wherein said medical information signals include information identifying the medical status of the patient relating to the stimulus, said monitor data processor being responsive to said display signal to format said medical information signals for printing, said monitoring means further including a plurality of peripheral ports for receiving peripheral devices;

printer means for printing information from said medical information signals, said printer means being constructed to mate with two of said plurality of ports of said monitoring means to be coupled to said monitoring means for printing information relating to the status of the patient, said printer means including a thermal array printing head and being responsive to said medical information signals for controlling said thermal array printing head to print information indicating the status of the patient relating to the stimulus, said thermal array printing head being springably mounted to said printer means, said printer means further including a paper tray receptacle having a switch mounted therein for providing a paper tray signal and having a drive gear mounted therein for providing rotational energy;

first paper tray means for dispensing paper of a first width upon which the information indicating the status of the patient will be printed, said first paper tray means being constructed to be inserted in said receptacle of said printer means, said first paper tray means including a first guide insert constructed to guide the paper of a first width past said thermal array printing head, said first paper tray means further including a first roller and positioning means for positioning said first roller in contact with said thermal array printing head when said first paper tray means is inserted in said receptacle of said printer means, said positioning means being further constructed to position said first roller so that a predetermined amount of pressure is applied to said thermal array printing head, said first paper tray means also including a first gear constructed to engage said drive gear of said printer means for receiving the rotational energy to rotate said first roller to propel the paper of a first width past said thermal printing means, said first paper tray means being further constructed to engage said switch of said printer means when said first paper tray means is inserted in said receptacle so that said paper tray signal is provided, said printing means being responsive to said paper tray signal to provide a first reformat signal and said monitor data processor being responsive to said first reformat signal to provide said medical information signals in a first format; and second paper tray means for dispensing paper of a second width upon which the information indicating the status of the patient will be printed., said second paper tray means also being constructed to be inserted in said receptacle of said printer means, said second paper tray means including a second guide insert constructed to guide the paper of a second width past said thermal array printing head, said second paper tray means further including a second roller having a length greater than that of said first roller and second positioning means for positioning said second roller in contact with said thermal array printing head when said second paper tray means is inserted in said receptacle of said printer means, said second positioning means being constructed to position said second roller so that said predetermined amount of pressure is applied to said thermal array printing head, said second paper tray means also including a second gear constructed to engage said drive gear of said printer means for receiving the rotational energy to rotate said second roller to propel the paper of a second width past said thermal printing means, said second paper tray means being further constructed to so that said second paper tray means does not engage said switch of said printer means when said second paper tray means is inserted in said receptacle so that said paper tray signal is not provided, said printing means being responsive to the absence of said paper tray signal to provide a second reformat signal and said monitor data processor being responsive to said second reformat signal to provide said medical information signals in a second format.

2. Apparatus for printing medical information signals from a medical monitor wherein the medical information signals are indicative of a medical status of a patient, said monitor being constructed to provide the medical information signals in a first format and a second format, said apparatus comprising:

printer means for printing information from the medical information signals, said printer means including a thermal array printing head springably mounted to said printer means, said printer means being responsive to the medical information signals for controlling said thermal array printing head to print information indicating the status of the patient wherein substantially all of said thermal array printing head is used when the medical information signals are provided in the first format and wherein a predetermined portion of said thermal array printing head is used when the medical information signal is provided in the second format, said printer means further including a paper tray receptacle having a switch mounted therein for providing a paper tray signal, said printer means being responsive to said paper tray signal for requesting the medical information signals be provided in said second format;

first paper tray means for dispensing paper upon which the information indicating the status of the patient will be printed, said first paper tray means being constructed to be inserted in said receptacle of said printer means, said first paper tray means including a first roller and positioning means for positioning said first roller in contact with said thermal array printing head when said first paper tray means is inserted in said receptacle of said printer means wherein said first roller is of a length substantially equal to that of said thermal array printing head, said positioning means being constructed to position said first roller so that a predetermined amount of pressure is applied to said thermal array printing head, said first paper tray means being further constructed so that said switch of said printer means is engaged when said first paper tray means is inserted in said receptacle so that said paper tray signal is provided and so that the medical information signals are requested to be in the first format; and second paper tray means for dispensing paper upon which the information indicating the status of the patient will be printed, said second paper tray means also being constructed to be inserted in said receptacle of said printer means, said second paper tray means including a second roller having a length substantially equal to said predetermined portion of said thermal array printing head and second positioning means for positioning said second roller in contact with said predetermined portion of said thermal array printing head when said second paper tray means is inserted in said receptacle of said printer means, said second positioning means being constructed to position said second roller so that said predetermined amount of pressure is applied to said thermal array printing head, said second paper tray means being further constructed to not engage said switch of said printer means when said second paper tray means is inserted in said receptacle so that said paper tray signal is not provided and the medical information signals are requested in the second format.

3. The apparatus as recited in claim 2 wherein said first paper tray means further includes a first guide insert constructed to guide paper of a first width intermediate said first roller and said thermal array printing head.

4. Apparatus as recited in claim 2 wherein said second paper tray means further includes a second guide insert constructed to guide paper of a second width intermediate said second roller and said predetermined portion of said thermal array printing head.

5. Apparatus for printing medical information signals from a medical monitor wherein the medical information signals are indicative of a medical status of a patient, said monitor being constructed to provide the medical information signals in a first format and a second format, said apparatus comprising:

printer means for printing information from the medical information signals, said printer means including a thermal array printing head and being responsive to the medical information signals for controlling said thermal array printing head to print information indicating the status of the patient wherein substantially all of said thermal array printing head is used when the medical information signals are provided in the first format and wherein a predetermined portion of said thermal array printing head is used when the medical information signal is provided in the second format, said printer means further including a paper tray receptacle having a switch mounted therein, said printer means being responsive to said switch for requesting the medical information signals be provided in the first and second format;

first paper tray means for dispensing paper upon which the information indicating the status of the patient will be printed, said first paper tray means being constructed to be inserted in said receptacle of said printer means so that said switch of said printer means is engaged and the medical information signals are requested in the first format, said first paper tray means including a first roller of a length substantially equal to that of said thermal array printing head; and second paper tray means for dispensing paper upon which the information indicating the status of the patient will be printed, said second paper tray means being constructed to be inserted in said receptacle of said printer means and to not engage said switch of said printer means so that the medical information signals are requested in The second format, said second paper tray means including a second roller having a length substantially equal to said predetermined portion of said thermal array printing head.

6. The apparatus as recited in claim 5 wherein said first paper tray means further comprises positioning means for positioning said first roller in contact with said thermal array printing head when said first paper tray means is inserted in said receptacle of said printer means.

7. The apparatus as recited in claim 5 wherein said second paper tray means further comprises second positioning means for positioning said second roller in contact with said predetermined portion of said thermal array printing head when said second paper tray means is inserted in said receptacle of said printer means.

8. The apparatus as recited in claim 6 wherein said second paper tray means further comprises second positioning means for positioning said second roller in contact with said predetermined portion of said thermal array printing head when said second paper tray means is inserted in said receptacle of said printer means.

9. The apparatus as recited in claim 8 wherein said first and second positioning means are constructed to position said first and second rollers, respectively, so that a predetermined amount of pressure is applied to said thermal array printing head.

10. The apparatus as recited in claim 5 wherein said first paper tray means further includes a first guide insert constructed to guide paper of a first width intermediate said first roller and said thermal array printing head.

11. Apparatus as recited in claim 5 wherein said second paper tray means further includes a second guide insert constructed to guide paper of a second width intermediate said second roller and said predetermined portion of said thermal array printing head.

12. The apparatus as recited in claim 5 wherein said primer means further includes a drive gear for providing rotational energy and wherein said first and second paper trays each include respective first and second gears for mating with said drive gear to provide the rotational energy to said first and second rollers.

13. Apparatus for printing medical information signals from a medical monitor wherein the medical information signals are indicative of a medical status of a patient, said monitor being constructed to provide the medical information signals in a first format and a second format, said apparatus comprising:

paper tray means for dispensing paper of a predetermined width upon which the information indicating the status of the patient will be printed, said paper tray means including indicator means for indicating the predetermined width of paper dispensed thereby: and printer means for receiving said paper tray means, said printer means including sensor means responsive to said indicator means for sensing the predetermined width of paper dispensed by said paper tray means, said printer means being responsive to said sensing means for requesting the medical information signals in a predetermined format and being responsive to medical information signals provided in the predetermined format for printing on the paper of the predetermined width, said paper tray means further including roller means constructed to mate with the paper of the predetermined width to apply a force to the paper so that the paper engages said printer means and so that a predetermined amount of pressure is created between the paper and said printer means.

14. Apparatus for printing medical information signals from a medical monitor wherein the medical information signals are indicative of a patient's medical status, said medical monitor being constructed to provide the medical information signals in a first format and a second format, said apparatus comprising;

paper tray means for dispensing paper of a predetermined width upon which the information indicating the status of the patient will be printed, said paper tray means including indicator means for indicating the predetermined width of paper dispensed thereby, said paper tray means further including roller means constructed to mate with the paper wherein said roller means has a roller having a length substantially equivalent to the predetermined width of the paper; and printer means for receiving said paper tray means, said printer means including sensor means responsive to said indicator means for sensing the predetermined width of paper dispensed by said paper tray means, said printer means being responsive to said sensing means for requesting the medical information signals in a predetermined format and being responsive to medical information signals provided in the predetermined format for printing on the paper of the predetermined width, said printer means including a thermal printing head, said roller means being further constructed to engage the paper with said thermal printing head so that a predetermined amount of pressure is created between the paper and said thermal printing head.

15. Apparatus for printing medical information signals from a medical monitor wherein the medical information signals are indicative of a medical status of a patient, said monitor being constructed to provide the medical information signals in a first format and a second format, said apparatus comprising:

paper tray means for dispensing paper of a predetermined width upon which the information indicating the status of the patient will be printed, said paper tray means including indicator means for indicating the predetermined width of paper dispensed thereby; and printer means for receiving said paper tray means, said printer means including sensor means responsive to said indicator means for sensing the predetermined width of paper dispensed by said paper tray means, said printer means being responsive to said sensor means for requesting the medical information signals in a predetermined format and being responsive to medical information signals provided in the predetermined format for printing on the paper of the predetermined width, said paper tray means further including engagement means constructed to mate with the paper of the predetermined width to apply a force to the paper so that the paper engages said printer means and so that a predetermined amount of pressure is created between the paper and said printer means.

16. The apparatus as recited in claim 15 wherein said engagement means comprises a roller.

17. The apparatus as recited in claim 13 wherein said roller means comprises a roller.

18. Apparatus for printing medical information signals from a medical monitor wherein the medical information signals are indicative of a medical status of a patient, said monitor being constructed to provide the medical information signals in a first format and a second format, said apparatus comprising:

paper tray means for dispensing paper of a predetermined width upon which the information indicating the status of the patient will be printed, said paper tray means including indicator means for indicating a predetermined width of paper dispensed thereby; and printer means for receiving said paper tray means, said printer means including sensor means responsive to said indicator means for sensing the predetermined width of paper dispensed by said paper tray means, said printer means being responsive to said sensor means and said medical information signals to print information corresponding to said medical information signals in a format determined responsive to said sensor means, said paper tray means further including engagement means constructed to mate with the paper of the predetermined width to apply a force to the paper so that the paper engages said printer means and so that a predetermined amount of pressure is created between the paper and said printer means.

* * * * *

UNITED STATES PATENT AND TRADEMARK OFFICE

CERTIFICATE OF CORRECTION

PATENT NO. : 5,361,085

DATED : November 1, 1994

INVENTOR(S) : Gary C. Vance

It is certified that error appears in the above-identified patent and that said Letters Patent is hereby corrected as shown below:

In column 10, claim 5, line 50, please delete "The" and substitute therefor --the--.

In column 11, claim 12, line 21, please delete "primer" and substitute therefor --printer--.

Signed and Sealed this

Twenty-eight Day of March, 1995

Attest:

BRUCE LEHMAN

*Attesting Officer*

*Commissioner of Patents and Trademarks*